(12) United States Patent
Schwamm et al.

(10) Patent No.: US 11,905,463 B2
(45) Date of Patent: Feb. 20, 2024

(54) PROCESS FOR PRODUCING PROPPANTS

(71) Applicant: Ralph Enderle, Nuremberg (DE)

(72) Inventors: Natalia Schwamm, Schwabach-Wolkersdorf (DE); Ralph Enderle, Nuremberg (DE)

(73) Assignee: Ralph Enderle, Nuremberg (DE)

( * ) Notice: Subject to any disclaimer, the term of this patent is extended or adjusted under 35 U.S.C. 154(b) by 9 days.

(21) Appl. No.: 17/778,990

(22) PCT Filed: Dec. 22, 2020

(86) PCT No.: PCT/EP2020/087699
§ 371 (c)(1),
(2) Date: May 23, 2022

(87) PCT Pub. No.: WO2021/151597
PCT Pub. Date: Aug. 5, 2021

(65) Prior Publication Data
US 2022/0411690 A1    Dec. 29, 2022

(30) Foreign Application Priority Data

Jan. 31, 2020 (DE) .................. 10 2020 102 489.4

(51) Int. Cl.
*C09K 8/80* (2006.01)

(52) U.S. Cl.
CPC .................. *C09K 8/80* (2013.01)

(58) Field of Classification Search
CPC .................. C09K 8/80
See application file for complete search history.

(56) References Cited

U.S. PATENT DOCUMENTS

| | | | |
|---|---|---|---|
| 5,624,491 A * | 4/1997 | Liskowitz | C04B 18/08 |
| | | | 106/737 |
| 9,587,170 B2 | 3/2017 | Enderle | |
| 2015/0152319 A1* | 6/2015 | Zhang | C04B 33/1324 |
| | | | 507/271 |
| 2021/0363057 A1* | 11/2021 | Khan | C04B 18/027 |

FOREIGN PATENT DOCUMENTS

| | | |
|---|---|---|
| CN | 103396784 A | 11/2013 |
| CN | 107963902 A | 4/2018 |
| CN | 110294626 A | 10/2019 |
| DE | 1671229 A1 | 9/1971 |
| DE | 2150677 A1 | 4/1973 |
| WO | 2013/153115 A2 | 10/2013 |

OTHER PUBLICATIONS

Neutralization of red mud with pickling waste liquor using Taguchi's design of experimental methodology, Rai et al., Waste Management & Research, 2012, 30(9), 922-93 (Year: 2012).*
PCT/ISA/210, "International Search Report for PCT International Application No. PCT/EP2020/087699," dated Apr. 8, 2021.

* cited by examiner

*Primary Examiner* — Aiqun Li
(74) *Attorney, Agent, or Firm* — Manabu Kanesaka

(57) ABSTRACT

The invention relates to a process for producing proppants, including the following steps: providing red mud, providing fly ash, producing a mixture from the red mud and the fly ash so that the mixture has a first moisture content in the range of 7 to 30 wt. %, producing a granular product from the mixture, and sintering the granular product.

14 Claims, 2 Drawing Sheets

PROCESS FOR PRODUCING PROPPANTS

RELATED APPLICATIONS

The present application is National Phase of International Application No. PCT/EP2020/087699 filed Dec. 22, 2020, and claim a priority from German Application No. DE 10 2020 102 489.4 filed Jan. 31, 2020, the disclosure of which is hereby incorporated by reference herein in its entirety.

The invention relates to a process for producing proppants and the use of red mud.

"Proppants" are ceramic support granular products. Such proppants are used, for example, in oil and gas production to support cavities in the rock.

DE 16 71 229 A discloses a process for the production of porous ceramic materials from red mud and fly ash. The porous ceramic materials have a density of at most 0.8 g/cm$^3$. Their strength is at most 0.5 MPa. The known ceramic materials are not suitable for the use of proppants.

WO 2013/153 115 A2 discloses a process for the wet chemical separation of at least a part of the iron-containing constituents from red mud.

DE 21 50 677 describes a process for the production of bricks from red mud. The bricks have a density of at most 0.95 g/cm$^3$. Their compressive strength is at most 0.3 MPa. The known material is not suitable for use as proppants.

According to the prior art, a process for producing a free-flowing sintered material is also known from U.S. Pat. No. 9,587,170 B2. The known material is used as a proppant in the extraction of crude oil by means of fracking. To produce the sintered material, the prior art mixes fly ash, bauxite and clay. The mixture is granulated. The granular product is then coated with bauxite, subsequently calcined and sintered.

The known process requires the use of valuable raw materials. It is relatively costly.

It is the object of the invention to provide a process for the production of a free-flowing sintered material which can be carried out as simply and inexpensively as possible. The sintered material is to be suitable in particular for use as a proppant.

This object is achieved by the features of claim 1.

Useful embodiments of the invention are apparent from the features of the dependent claims.

According to the invention, a process for producing a free-flowing sintered material or proppant is proposed comprising the following steps:
  providing red mud,
  providing fly ash,
  producing a mixture from the red mud and the fly ash so that the mixture has a first moisture content in the range of 7 to 30 wt. %,
  producing a granular product from the mixture, and
  sintering the granular product.

The term "red mud" refers to a bauxite residue that is produced during the extraction of aluminum oxide from aluminum-bearing ores, in particular bauxite. More than 95% of the aluminum oxide produced worldwide is manufactured using the Bayer process. This process produces around 1 to 1.5 metric tons of red mud per metric ton of alumina.

Because of the caustic soda used in the Bayer process, the red mud has a pH of at least 11. In addition to iron oxide, red mud contains heavy metal oxides and heavy metal hydroxides. Overall, red mud forms a significant hazard for the environment.

The term "fly ash" is understood to mean a solid, disperse residue which is produced during combustion in thermal power plants and/or waste incineration plants and is separated from the flue gas by means of dedusting devices. Fly ash usually has average particle sizes in the range of 3 to 20 μm and a residual moisture content of less than 1 wt. %.

The term "free-flowing material" is understood to mean a granular material whose grain size, grain size distribution and surface properties are such that it is capable of flowing. The flowability of a material can be determined with a device according to DIN EN ISO 6186. For this purpose, a specified quantity of the free-flowing material is placed in a standardized funnel and the time taken for the material to pass through the funnel is measured.

The process proposed in accordance with the invention enables a free-flowing sintered material to be produced in a simple and cost-effective manner using red mud and fly ash. The sintered material has a pH of less than about 8.8. It is not environmentally hazardous and is particularly suitable for use as a proppant. As a result, the process according to the invention makes it possible, on the one hand, to dispose of highly toxic red mud and, on the other hand, to produce proppants in particular at low cost.

According to a further advantageous embodiment, the first moisture content in the mixture is 10 to 21 wt. %. Such a mixture can be granulated particularly well.

According to an advantageous embodiment, the red mud has a second moisture content of at least 10 wt. %, preferably at least 15 wt. %. The second moisture content in the red mud is expediently at most 30 wt. %. A red mud having the aforementioned second moisture content is eminently suitable for producing the granular product.

Suitably, the mixture contains 50 to 90 wt. %, preferably 60 to 75 wt. %, of red mud. The proposed mixture can be used in particular to produce proppants with a high strength.

According to a particularly advantageous embodiment, to adjust the first moisture content in the mixture, the second moisture content in the red mud is reduced by admixing fly ash to the red mud. Using the aforementioned process step, a separate energy-consuming drying step for adjusting the first moisture content in the mixture can be omitted. This further increases the efficiency of the proposed process.

It is expedient that the red mud has a pH value of at least 10, preferably at least 11. That is, the process allows the use of red mud without first having to reduce its pH by neutralization. Thus, the proposed process is simple and inexpensive.

According to a further embodiment, the fly ash has a third moisture content of at most 2 wt. %, preferably at most 1 wt. %. Common fly ashes have the aforementioned third moisture contents. They can be used to prepare the mixture without prior modification of the third moisture content.

Fly ashes with an average particle size D50 in the range of 1 to 15 μm have proven to be suitable for the production of the mixture. The addition of such fly ashes results in a particularly strong sintered material.

The granular product is suitably dried, then a predetermined grain fraction, for example in a diameter range of 0.2 to 2.0 mm, is separated from the granular product by sieving. The remainder can again be used for the production of the granular product.

After a further process step, the granular product is calcined at a temperature of 700° C. to 1.050° C. before sintering. Sintering of the granular product is expediently carried out at a temperature in the range from 1.050° C. to 1.300° C. The calcining and sintering step can be carried out in a rotary kiln with different heating zones.

The sintered material is expediently formed from spherical particles with an average diameter of 0.1 to 2.4 mm, preferably 0.1 to 1.5 mm. Such a material is particularly suitable for use as a proppant.—However, the sintered material is also suitable as an aggregate for building materials, in particular concrete, bricks, tiles, roofing tiles and the like. In addition, the sintered material is also particularly suitable as a molding sand for the production of casting molds or as an aggregate for a molding sand.

It is also proposed to use a mixture of red mud and fly ash for the production of proppants, molding sand, bricks, roof tiles, tiles or as an aggregate for building materials. In particular, for the production of bricks, roof tiles, tiles and the like, the production of a granular product is not necessary.—For advantageous embodiments of the mixture, reference is made to the above explanations.

Surprisingly, highly toxic red mud with a pH of at least 11 is suitable as a raw material for the production of a free-flowing sintered material. The sintered material has a pH value in the range of 7 to 8.8. The metals contained in the red mud are bound therein as metal oxides. The sintered material is environmentally compatible.

The proppants produced by the process according to the invention have a strength of at least 30 MPa, preferably at least 40 MPa, particularly preferably at least 70 MPa. The process according to the invention can also be used to produce proppants with a strength of at least 80 MPa. For the determination of the strength of proppants, reference is made to DIN EN ISO 13503-2.

The density of the proppants produced is preferably 1.0 to 3.8 g/cm³, in particular 1.5 to 3.2 g/cm³, more preferably 2 to 2.8 g/cm³.

In the following, an embodiment of the invention is explained in more detail with reference to the drawings. It shows:

FIG. 1 a grain size distribution of sintered material,
FIG. 2 the sintered material,
FIG. 3 Cr leaching of the sintered material over time, and
FIG. 4 Na leaching of the sintered material over time.

Table 1 below shows chemical compositions of red mud used.

TABLE 1

| | Chemical composition of red mud | | | | | | | | | |
|---|---|---|---|---|---|---|---|---|---|---|
| SAMPLE | $Al_2O_3$ | $SiO_2$ | CaO | $Fe_2O_3$ | $TiO_2$ | $SO_3$ | $P_2O_5$ | BaO | SrO | $Mn_3O_4$ |
| Red Mud #1 | 17.57 | 6.77 | 6.56 | 51.98 | 12.08 | 0.22 | 0.54 | 0.01 | 0.01 | 0.02 |
| Red Mud #2 | 15.13 | 5.48 | 6.31 | 53.55 | 13.20 | 0.20 | 0.53 | 0.03 | 0.01 | 0.04 |
| Red Mud #3 | 18.03 | 12.79 | 1.18 | 32.93 | 7.32 | 0.15 | 0.33 | 0.02 | 0.04 | 0.01 |

The red mud has a second moisture content in the range of 22 to 26 wt. %. The average grain size D50 is about 1.7 µm.

Table 2 below shows chemical compositions of fly ashes used.

TABLE 2

| | Chemical composition of fly ash | | | | | | | | | |
|---|---|---|---|---|---|---|---|---|---|---|
| SAMPLE | $Al_2O_3$ | $SiO_2$ | CaO | $Fe_2O_3$ | MgO | $SO_3$ | $P_2O_5$ | $K_2O$ | BaO | $TiO_2$ |
| Fly Ash_1 | 19.44 | 51.58 | 7.52 | 6.75 | 1.04 | 1.84 | 0.18 | 2.00 | 0.28 | 0.12 |
| Fly Ash_2 | 29.20 | 55.75 | 0.90 | 4.12 | 0.47 | 1.89 | 0.33 | 0.78 | 0.29 | 2.12 |
| Fly Ash_3 | 27.71 | 61.36 | 2.21 | 4.45 | 0.96 | 1.01 | 0.17 | 1.00 | 0.30 | 2.07 |

The fly ashes have a third moisture content of about 0.6 wt. %. An average grain diameter D50 of the fly ashes is about 4.1 µm.

To prepare the mixture of the red mud and fly ash, fly ash is stirred into the red mud until a first moisture content of the mixture is about 10 to 18 wt. %, preferably 11 to 16 wt. %.

Subsequently, the mixture is filled into an Eirich R02 mixer. Of course, it is also possible to use other granulating mixers with a high shear field, similar to an Eirich mixer. It is also possible to granulate the mixture by means of spray drying or in granulation pans, for example.

Table 3 below shows an example of a granulation protocol.

TABLE 3

| | Granulation protocol | | | | | |
|---|---|---|---|---|---|---|
| | Settings | | Mixing method | | Water | |
| Step | Rotor | Vessel | [ccf/cf] | Process step | additive [g] | Time [s] |
| 1 | C 1 | 2 | ccf | Dry mix | 0 | 60 |
| 2 | C 1 | 2 | ccf | Water additive | 0 | 15 |
| 3 | C 2 | 2 | ccf | Water additive | 360 | 60 |
| 4 | C 2 | 2 | ccf | Micro granulation | 0 | 120 |
| 5 | B 2 | 2 | ccf | Micro ganulate growth | 0 | 120 |
| 6 | A 2 | 2 | ccf | round granules | 0 | 60 |
| 7 | A 2 | 2 | ccf | Pulverization | 0 | 60 |
| 8 | A 1 | 2 | ccf | Finishing | 0 | 60 |

Table 4 below describes the "Settings" in Table 3.

TABLE 4

| Settings according to Table 3 | | | |
|---|---|---|---|
| Settings | | | |
| Granulation tool 1 diameter | | 0.136 | m |
| Granulation tool 2-diameter (pin type) | | 0.136 | m |
| Rotor | | | |
| | A | B | C |
| V-belt adjustment | | | |
| Rotation speed stage 1 [rpm] | 900 | 1.500 | 2.500 |
| Rotation speed stage 2 [rpm] | 1.800 | 3.000 | 5.000 |
| Peripheral speed [m/s] | | | |
| Level 1 | 6.41 | 10.68 | 17.80 |
| Level 2 | 12.82 | 21.36 | 35.60 |

According to the protocol (see Table 3), the mixture is first mixed in counter current flow (ccf) for 60 seconds to produce granular products. In steps 2 and 3, water is added. In step 4, the first micro granulation of the mixture takes place for a period of 120 seconds.

In step 5, growth of the grains of the microgranular product takes place. Step 5 is carried out until the grains have grown to the desired size.

In steps 6 to 8, the grains formed are rounded. In step 8, the surface of the grains is smoothed.

Advantageously, the granular product can be produced without the use of a binder.

The produced granular product has a fourth moisture content in the range of 7 to 11 wt. %.

In particular, for the production of proppants, the granular product is advantageously dried and then optionally screened, whereby a grain fraction in the range of 0.2 to 2.0 mm, preferably 0.2 to 1.0 mm, is separated.

For the separation of the aforementioned grain fraction, a vibrating screen with a screen combination of 30/50 mesh is expediently used. Of course, other grain fractions can also be separated. Suitable screen combinations are, for example, 16/30 mesh, 40/70 mesh, etc.

Subsequently, the granular product is first calcined, e.g. in a rotary kiln, at a temperature in the range of 750° C. to 850° C. for a period of 5 to 30 minutes, preferably 5 to 15 minutes. Subsequently, the calcined granular product is sintered at a temperature in the range of 1.100° C. to 1.300° C. for a period of 5 to 30 minutes, preferably 5 to 15 minutes.

The sintered material consists of spherical particles. For the production of proppants in particular, the sintered material can be classified again by means of sieving. Advantageously, a suitable grain fraction can be separated by means of a 30/50 mesh screen combination.

FIG. 1 shows the grain size distribution of a sintered material produced in this way. The sintered material is suitable for use as a proppant. An average grain diameter D50 of the proppants here is 0.66 mm.

FIG. 2 shows the proppants according to FIG. 1. A roundness of the proppants here is 0.8, their sphericity 0.9. The proppants fulfilled the necessary requirements of a roundness of at least 0.6 and a sphericity of at least 0.6. The determination of the roundness and sphericity of the proppants is carried out according to the standard DIN EN ISO 13503-2 by Krumbein and Schloss.

FIGS. 3 and 4 show results of comparative leaching tests. To perform the leaching tests, 25 grams of each sample was mixed with 500 ml of distilled water in a glass bottle. Samples were taken after 1 hour, 24 hours, 7 days and 28 days. About 12 ml of liquid was filtered, 10 ml of the filtered solution was taken and mixed with 3 drops of high purity 65% $HNO_3$. The samples (leachates in FIG. 3 and FIG. 4) were then measured by ICP-MS, using a Thermo iCAP QcICP-MS.

FIG. 3 shows the leaching of Cr over time. FIG. 4 shows the leaching of Na over time. For comparison, fly ash, bauxite residue and sand are shown. The sintered material "RM/IF 60/40" has 60 wt. % red mud and 40 wt. % fly ash in the mixture. The other sintered materials "RM/IF 70/30 batch 1" and "RM/IF 70/30 batch 2" were produced from a mixture containing 70 wt. % of red mud and 30 wt. % of fly ash.

Figure 1:
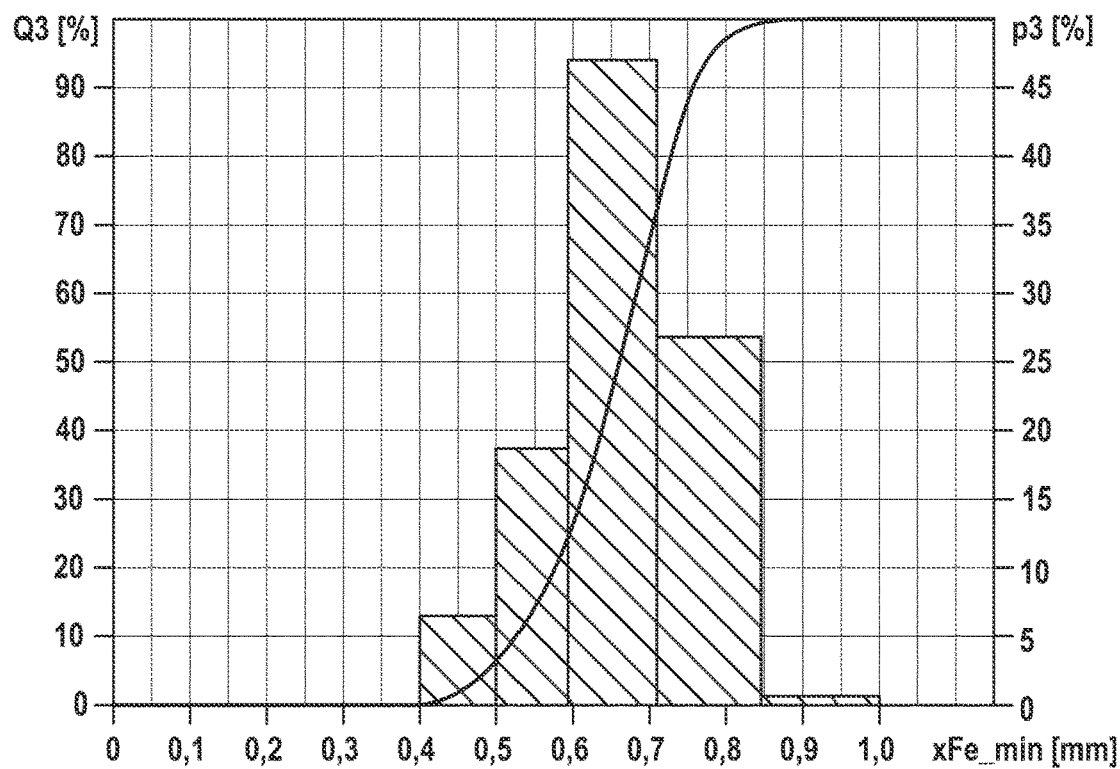
Figure 2:
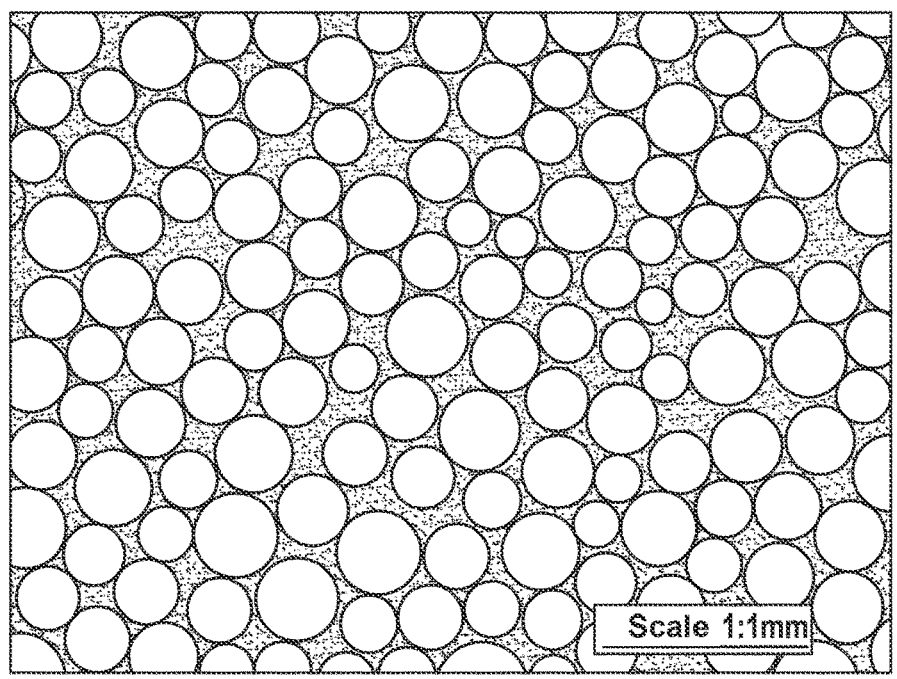
Figure 3:
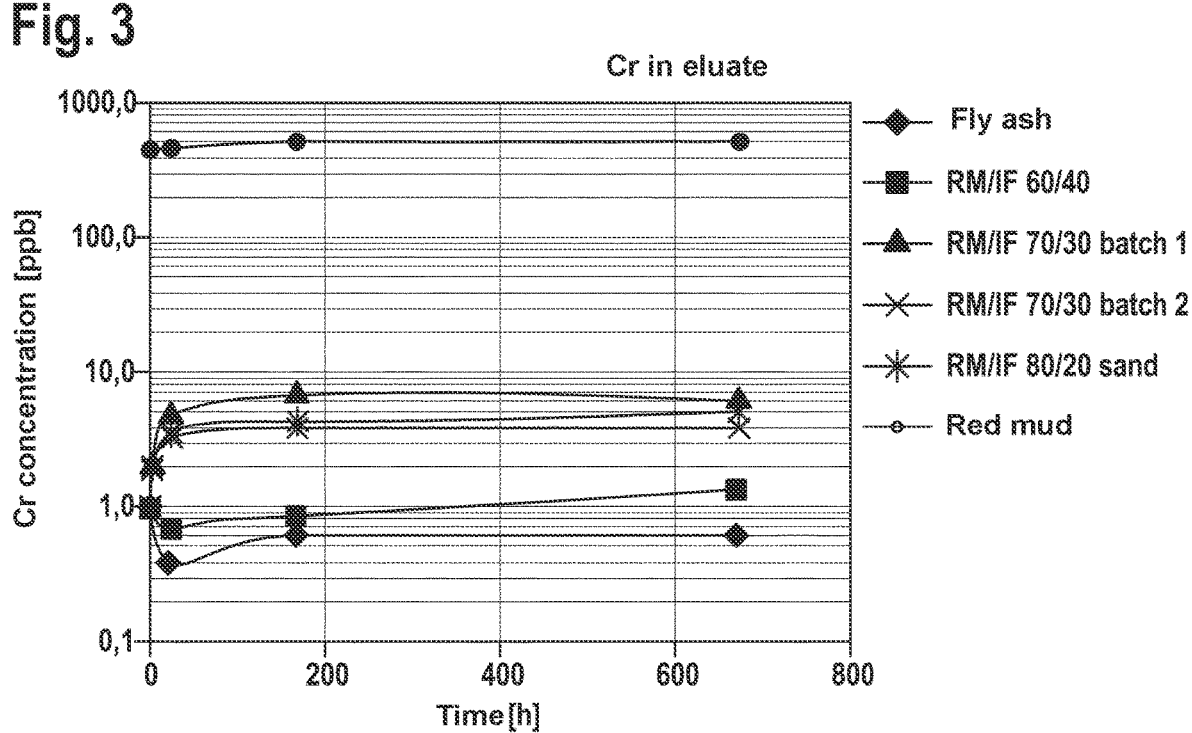
FIG. 3 shows that Cr is excellently bound in the sintered material. Even after a period of 600 hours, Cr is only leached from the sintered material in a concentration well below 10.0 ppb.
Figure 4:
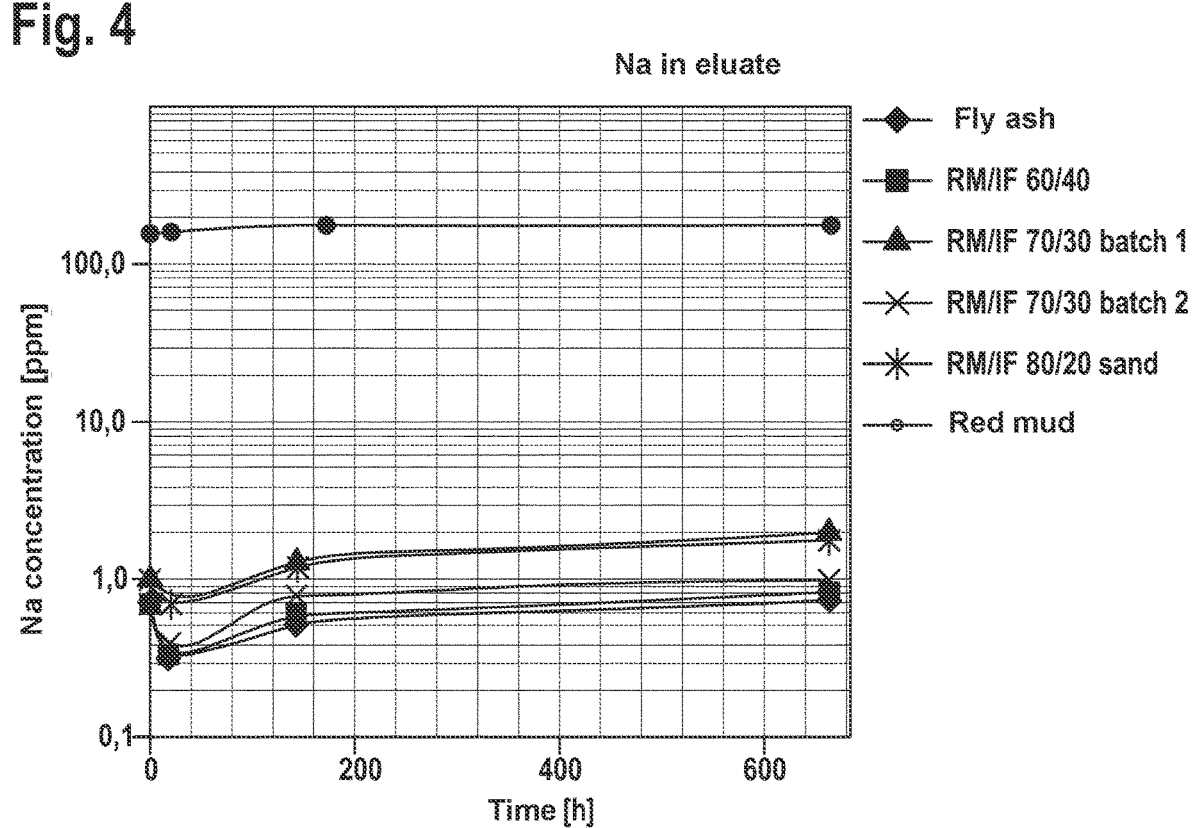
FIG. 4 shows that the sintered material releases about 100 times less Na than the red mud used.

The invention claimed is:

1. A process for producing proppants, comprising the following steps:
   providing red mud,
   providing fly ash,
   producing a mixture from the red mud and the fly ash so that the mixture has a first moisture content in a range of 7 to 30 wt. %,
   producing a granular product from the mixture,
   calcining the granular product at a temperature of 700° C. to 1,050° C., and then
   sintering the granular product calcined, at a temperature in a range of 1,050° C. to 1,300° C.

2. The process of claim 1, wherein the first moisture content in the mixture is 10 to 21 wt. %.

3. The process according to claim 1, wherein the red mud has a second moisture content of at least 10 wt. %.

4. The process according to claim 3, wherein to adjust the first moisture content in the mixture, the second moisture content in the red mud is reduced by admixing the fly ash to the red mud.

5. The process according to claim 3, wherein the second moisture content in the red mud is at most 30 wt. %.

6. The process according to claim 1, wherein the mixture contains 50 to 90 wt. %.

7. The process according to claim 1, wherein the red mud has a pH of at least 10.

8. The process according to claim 1, wherein the fly ash has a third moisture content of at most 2 wt. %, preferably at most 1 wt. %.

9. The process according to claim 1, wherein the fly ash has a mean particle size D50 in a range of 1 to 15 μm.

10. The process according to claim 1, wherein the granular product is dried.

11. The process according to claim 1, wherein a predetermined grain fraction is separated from the granular product by means of sieving.

12. The process according to claim 1, wherein the proppants are formed of spherical particles having an average diameter in a range from 0.1 to 2.4 mm.

13. The process according to claim 1, wherein the proppants have a density greater than 1.0 $g/cm^3$.

14. The process according to claim 1, wherein the granular product is calcined at a temperature of 700° C. to 1,050° C. for 5 to 30 minutes, and then the granular product calcined, is sintered at a temperature in a range of 1,050° C. to 1,300° C. for 5 to 30 minutes.

\* \* \* \* \*